US011064204B2

(12) United States Patent
Brice et al.

(10) Patent No.: US 11,064,204 B2
(45) Date of Patent: Jul. 13, 2021

(54) AUTOMATIC VIDEO COMPARISON OF THE OUTPUT OF A VIDEO DECODER

(71) Applicant: ARRIS Enterprises LLC, Suwanee, GA (US)

(72) Inventors: Pierre Brice, Edison, NJ (US); Gautam Babbar, Philadelphia, PA (US); Daniel Hillegass, Warrington, PA (US); Olga Malysheva, Saint Petersburg (RU)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/588,811

(22) Filed: Sep. 30, 2019

(65) Prior Publication Data

US 2020/0059652 A1    Feb. 20, 2020

Related U.S. Application Data

(63) Continuation-in-part of application No. 15/595,413, filed on May 15, 2017, now abandoned, which is a continuation-in-part of application No. 14/278,297, filed on May 15, 2014, now abandoned.

(51) Int. Cl.
*H04N 19/154* (2014.01)
*H04N 19/159* (2014.01)
*H04N 19/176* (2014.01)

(52) U.S. Cl.
CPC ......... *H04N 19/154* (2014.11); *H04N 19/159* (2014.11); *H04N 19/176* (2014.11)

(58) Field of Classification Search
CPC ... H04N 19/154; H04N 19/159; H04N 19/176
See application file for complete search history.

(56) References Cited

U.S. PATENT DOCUMENTS

| | | | |
|---|---|---|---|
| 5,680,322 | A | 10/1997 | Shinoda |
| 6,075,561 | A | 6/2000 | Janko |
| 6,091,777 | A | 7/2000 | Guetz |
| 6,281,929 | B1 | 8/2001 | Fimoff |

(Continued)

OTHER PUBLICATIONS

M. Hasan, et al., "Hawkeye: Cloud Based Video-Error Detection Server", Department of Computer Engineering, Kyung Hee University, pp. 446-701, Yongin-si, Gyeonggi-do, Republic of Korea, 2pp.

(Continued)

*Primary Examiner* — Brian P Yenke
(74) *Attorney, Agent, or Firm* — Buchanan, Ingersoll & Rooney PC

(57) ABSTRACT

The automatic video comparison system for measuring the quality of decoded data described herein provides a method for measuring the quality of decoded data at the level of sub-units of a unit of data, for instance at the level of sub-blocks of a video frame. The system can therefore locate defects that may not otherwise be detected by an automated system that measures quality at the level of the entire frame. Processing encoded media is computationally intensive, thus the automatic video comparison system uses a distributed computing system in order to distribute the computations across many compute resources that are capable of operating in parallel.

7 Claims, 7 Drawing Sheets

(56) References Cited

U.S. PATENT DOCUMENTS

| | | |
|---|---|---|
| 6,400,400 B1 | 6/2002 | Isnardi |
| 6,603,505 B1 | 8/2003 | Kawada |
| 7,385,627 B2 | 6/2008 | Sugimoto |
| 7,586,515 B2 | 9/2009 | Straney |
| 7,936,818 B2 | 5/2011 | Jayant |
| 8,150,234 B2 | 4/2012 | Bourret |
| 8,184,163 B2 | 5/2012 | Ferguson |
| 8,184,164 B2 | 5/2012 | Yang et al. |
| 8,189,666 B2 | 5/2012 | Wu |
| 8,249,358 B2 | 8/2012 | Yamada |
| 8,310,548 B2 | 11/2012 | Villanueva |
| 8,320,747 B2 | 11/2012 | Ushiki |
| 8,331,443 B2 | 12/2012 | Rhie et al. |
| 8,339,976 B2 | 12/2012 | Gustafsson et al. |
| 8,374,246 B2 | 2/2013 | Raveendran |
| 8,428,301 B2 | 4/2013 | Radhakrishnan |
| 8,456,531 B2 | 6/2013 | Winkler |
| 8,525,883 B2 | 9/2013 | Vu |
| 8,531,979 B2 | 9/2013 | Patil |
| 8,581,987 B1 | 11/2013 | Chu |
| 8,718,145 B1 | 5/2014 | Wang |
| 8,848,061 B2 | 9/2014 | Kolarov |
| 9,131,241 B2* | 9/2015 | Ji ............... H04N 19/61 |
| 9,171,577 B1* | 10/2015 | Newman ......... G11B 27/031 |
| 9,325,985 B2* | 4/2016 | Kolarov ......... H04N 17/002 |
| 9,521,411 B2 | 12/2016 | Raveendran |
| 9,554,134 B2* | 1/2017 | Sermadevi ....... H04N 19/15 |
| 9,774,848 B2 | 9/2017 | Jayant |
| 9,781,420 B2 | 10/2017 | Schoenblum |
| 9,967,580 B2* | 5/2018 | Newman ......... G11B 27/031 |
| 10,178,390 B2* | 1/2019 | Lee ............. H04N 19/15 |
| 10,182,233 B2 | 1/2019 | Schoenblum |
| 10,185,884 B2 | 1/2019 | Kolarov |
| 10,186,297 B2* | 1/2019 | Kolarov ......... H04N 17/002 |
| 10,368,074 B2* | 7/2019 | Holcomb ......... H04N 19/132 |
| 10,630,748 B1* | 4/2020 | Hegar ........... H04N 21/23106 |
| 10,880,551 B2* | 12/2020 | Topiwala ........ G06N 3/0472 |
| 10,957,358 B2* | 3/2021 | Kolarov ......... G06T 5/00 |
| 2003/0029310 A1 | 2/2003 | Glasson |
| 2003/0076418 A1 | 4/2003 | Nishio |
| 2004/0114817 A1 | 6/2004 | Jayant |
| 2004/0183950 A1 | 9/2004 | Sugimoto |
| 2005/0024487 A1 | 2/2005 | Chen |
| 2006/0165176 A1 | 7/2006 | Raveendran |
| 2007/0206095 A1 | 9/2007 | Kawada |
| 2007/0217505 A1* | 9/2007 | Lipka ........... H04N 19/159 375/240.02 |
| 2007/0217519 A1 | 9/2007 | Murayama |
| 2008/0025400 A1 | 1/2008 | Sugimoto |
| 2008/0278629 A1 | 11/2008 | Yamada |
| 2010/0053336 A1 | 3/2010 | Bourret |
| 2010/0086024 A1 | 4/2010 | Zhang |
| 2010/0091861 A1 | 4/2010 | Sung |
| 2010/0128778 A1* | 5/2010 | Ji ............... H04N 19/61 375/240.2 |
| 2010/0195721 A1 | 8/2010 | Wu |
| 2010/0259625 A1 | 10/2010 | Yamada |
| 2011/0038548 A1 | 2/2011 | Rezazdeh |
| 2011/0255589 A1 | 10/2011 | Saunders |
| 2011/0292996 A1 | 12/2011 | Jayant |
| 2012/0213286 A1 | 8/2012 | Wu |
| 2013/0004074 A1 | 1/2013 | Gish |
| 2013/0063608 A1 | 3/2013 | Tierney |
| 2013/0188742 A1 | 7/2013 | Raveendran |
| 2014/0002670 A1 | 1/2014 | Kolarov |
| 2014/0078165 A1 | 3/2014 | Messmer |
| 2014/0240522 A1 | 8/2014 | Lee |
| 2014/0354826 A1 | 12/2014 | Kolarov |
| 2015/0181207 A1 | 6/2015 | Agrawal |
| 2015/0334386 A1 | 11/2015 | Brice |
| 2015/0373328 A1 | 12/2015 | Yenneti |
| 2015/0382001 A1* | 12/2015 | Newman ......... G11B 27/031 375/240.25 |
| 2016/0007046 A1* | 1/2016 | Chou ........... H04N 19/149 375/240.02 |
| 2016/0240224 A1* | 8/2016 | Kolarov ......... H04N 17/002 |
| 2017/0026658 A1* | 1/2017 | Newman ......... G11B 27/031 |
| 2017/0201760 A1* | 7/2017 | Newman ......... G11B 27/031 |
| 2017/0244965 A1 | 8/2017 | Carmel |
| 2017/0249521 A1* | 8/2017 | Brice ........... G06K 9/036 |
| 2017/0272755 A1 | 9/2017 | Holcomb |
| 2017/0289551 A1 | 10/2017 | Lee |
| 2017/0339410 A1 | 11/2017 | Schoenblum |
| 2018/0007362 A1 | 1/2018 | Krishnan |
| 2018/0068195 A1 | 3/2018 | Kolarov |
| 2019/0172494 A1 | 6/2019 | Kolarov ......... H04N 17/002 |

OTHER PUBLICATIONS

Z. Wang, AC. Bovik, H.R. Sheikh, and P. Simoncelly, "Image Quality Assessment: From Error Visibility to Structural Similarity," IEEE Trans. Image Processing, vol. 13, No. 4, Apr. 2004 (13 pages).

* cited by examiner 4.d

| 0.7 | 0.7 | 1.0 | 1.0 | 1.0 | 1.0 |
| 0.7 | 0.8 | 0.8 | 0.8 | 0.9 | 0.9 |
| 0.7 | 0.8 | 0.7 | 0.7 | 0.6 | 0.9 |
| 1.0 | 0.8 | 0.7 | 0.5 | 0.6 | 0.9 |
| 1.0 | 0.8 | 0.7 | 0.5 | 0.6 | 0.9 |
| 1.0 | 0.8 | 0.9 | 0.9 | 0.9 | 0.9 |
| 1.0 | 1.0 | 0.8 | 0.8 | 0.8 | 0.8 |

AUTOMATIC VIDEO COMPARISON OF THE OUTPUT OF A VIDEO DECODER

CLAIM OF PRIORITY

This is a Continuation-in-Part of U.S. patent application Ser. No. 15/595,413 filed on May 15, 2017, which is a Continuation-in-Part of U.S. patent application Ser. No. 14/278,297 filed on Mar. 15, 2014, both of which are incorporated by reference herein in their entirety.

INTRODUCTION

In the production and testing of devices that decode compressed audio, video, and text, it is important to detect problems with the quality of the decoded data. Once the quality of the original encoded video is assured, poor quality indicates a problem with the decoder device.

Quality assurance laboratories typically test banks of new decoder devices simultaneously, thus require scalable quality testing devices and systems. Scalability requires that testing methods be cost-effective, efficient, consistent, and accurate.

One method for detecting quality issues is for a human tester to monitor the output of the decoder device and identify instances of video or other impairments. This method is not cost-effective or efficient, and is prone to the subjective differences between testers.

An alternative method is automatic video and audio comparison provided by a device or system, which require less input from a human tester. Many of these devices and systems are based on a reference-based approach. Under this approach, a "golden reference" data stream is compared to the decoded output of the device-under-test on a frame-by-frame basis. The golden reference data might be generated by a device known to consistently produce decoded data of an accepted quality.

Other systems do not use generic golden reference data because of the extensive resources required to generate the data. These systems instead use indirect reference entities or data streams with restricted characteristics to infer the quality of the data being tested. Such systems may for example, use special water marks inserted in the frames, or references with rapid scene changes, so that the reference data and the decoded data from the device under test can be properly aligned.

Existing automated devices and systems generally, however, do not meet the scalability requirements of a quality assurance laboratory. Existing devices and systems require costly, dedicated hardware and/or software, including specialized video processing cards. Additionally, systems that rely on frame-level comparison may not detect subtle problems evident to the human eye, but that are lost when the comparison metric is spread across the whole frame, thus reducing the consistency and accuracy of such devices. Moreover, systems that rely on a dedicated device to generate golden reference data will not be available for initial testing of new technologies.

Examples of full-reference-based video comparison products include those provided by Video Clarity of Campbell, Calif., http://www.videoclarity.com, and National Instruments of Austin, Tex., http://www.ni.com.

SUMMARY

In one embodiment, a method for automatic detection of the quality of a decoded video stream is disclosed. The method comprises receiving an encoded video stream, decoding the encoded video stream into a decoded video stream, the decoded video stream comprising at least one decoded video frame. The method further comprises producing a reference video data stream from the encoded video stream, the reference video data stream comprising at least one window of reference video data, the at least one window of reference video data comprising corresponding blocks of reference video data frames. The method further comprises comparing the at least one decoded video frame with the at least one window of reference video data by comparing blocks of each of the at least one decoded video frame with the corresponding blocks of reference video data frames from the at least one window of reference video data, while the at least one decoded video frame and the blocks of reference video data frames are misaligned. The method further comprises producing a quality measurement for each block of the at least one decoded video frame using a quality metric.

In one embodiment, a system for automatic detection of the quality of a decoded video stream is disclosed. The system comprises a decoder configured to receive an encoded video stream and further configured to decode the encoded video stream into a decoded video stream, the decoded video stream comprising at least one decoded video frame. The decoder is further configured to produce a reference video data stream from the encoded video stream, the reference video data stream comprising at least one window of reference video data, the at least one window of reference video data comprising corresponding blocks of reference video data frames. The system further comprises a video comparison controller configured to compare the at least one decoded video frame with the at least one window of reference video data and further configured to compare the blocks of each of the at least one decoded video frame with corresponding blocks of reference video data frames from the at least one window of reference video data, and produce a quality measurement for each block using a quality metric.

In one embodiment, a system for automatic detection of the quality of a decoded video stream is disclosed, the system comprising a decoder configured to decode an encoded video stream and configured to produce a decoded video stream. The system further comprises a video comparison controller configured to generate a report on the quality of the decoded video stream in accordance with quality measurements of one or more decode video frames from the decoded video stream.

In one embodiment a system for automatic detection of the quality of a decoded video stream is disclosed, the system comprising at least one compute resource, wherein the at least one compute resource operates independently and in parallel to other compute resources, wherein the at least one compute resource is configured to: receive a segment of decoded video stream, receive a segment of approximately temporally corresponding reference video stream, and analyze each decoded video frames from the segment of the decoded video stream.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

The novel features of the embodiments described herein are set forth with particularity in the appended claims. The embodiments, however, both as to organization and methods of operation may be better understood by reference to the following description, taken in conjunction with the accompanying drawings as follows.

DESCRIPTION

Audio/Video Decoders

Figure 1A:
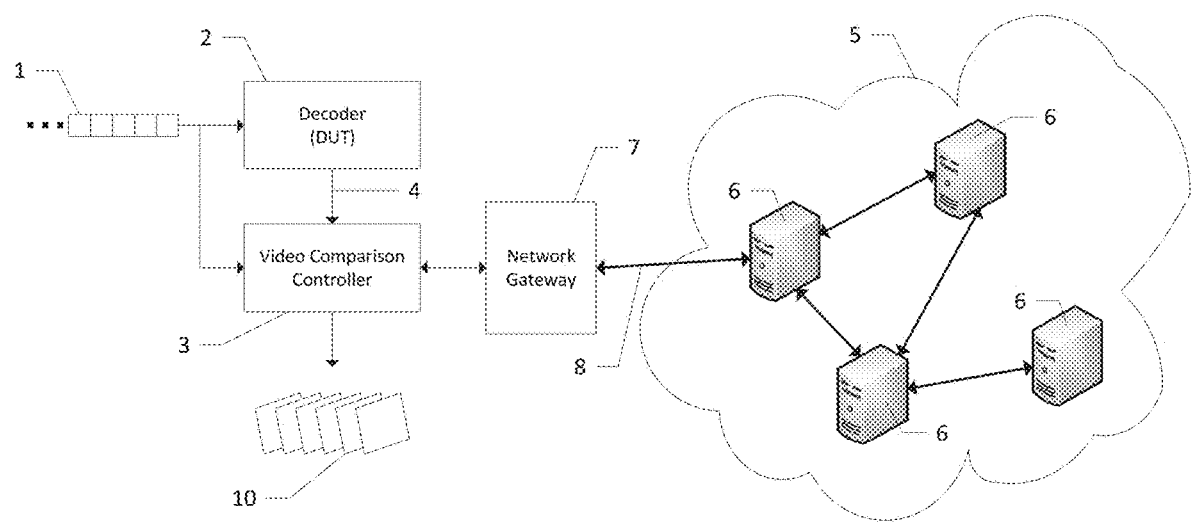
FIG. 1A illustrates one embodiment of an automatic video comparison system.

Audio, video, graphic, and text media is frequently transported digitally. Raw digital media typically requires large amounts of data to accurately represent its analog equivalent. In order to more quickly and efficiently transport digital media, the media is often encoded into smaller amounts of data prior to transmission, using a hardware or software encoder. When the media reaches its destination, it will be decoded before being played back, using a hardware or software decoder.

Defects in the hardware or software decoder may affect the output of the decoder. Defects in the decoder output can manifest visually and/or audibly, thus affecting the quality of the media playback. Defects can also be introduce during the transmission of the data, because the data can become corrupted or parts of it can be lost; however, assuming that the encoded data delivered to a decoder is defect-free, the decoder is expected to produce output that is also defect free. Types of visual defects include, for example, dropped frames, which manifest visually as jumps in the picture, duplicate frames, which manifest as time lags, and artifacts that distort all or part of the picture. Types of audible defects include, for example, hissing, blips, ringing, and other noise that was not in the original data, as well as signal loss or corruption, which may renders all or part of the audio inaudible.

The automatic video comparison system for measuring the quality of decoded data described herein provides a scalable testing method that is cost-effective, efficient, consistent, and accurate. The automatic video comparison system can measure the quality of decoded data at the level of sub-units of a unit of data, for instance at the level of sub-blocks of a video frame. The system can therefore locate defects that may not otherwise be detected by an automated system that measures quality at the level of the entire frame. Processing encoded media is computationally intensive, thus the automatic video comparison system uses a distributed computing system in order to distribute the computations across many compute resources that are capable of operating in parallel. The system can be used to measure the quality of output from hardware and/or software decoders in either a bring-up laboratory or a production-level quality assurance laboratory or any size laboratory in between. The automatic comparison system allows for testing the capability of decoders as well as the quality of the decoded output.

Decoders that can be tested using the automatic video comparison system disclosed herein can be implemented in any combination of hardware and/or software. Examples of decoders include, for example, set-top devices, media gateways, media cards, audio/video chips, media players and the like. Decoders are used to decode and play back—or are used in conjunction with or as part of a system that is capable of playing back—encoded audio, video, graphics, text, or any combination thereof.

Examples of audio codecs used to generate encoded audio include but are not limited to: Linear Pulse Code Modulation (LPCM, or PCM, Pulse-density modulation (PDM), Pulse-amplitude modulation (PAM), Apple Lossless Audio Codec (ALAC), ATRAC Advanced Lossless (AAL), Direct Stream Transfer (DST), Dolby TrueHD, DTS-HD Master Audio, Free Lossless Audio Codec (FLAC), Lossless Audio (LA), Lossless Predictive Audio Compression (LPAC), Lossless Transform Audio Compression (LTAC), MPEG-4 Audio Lossless Coding (MPEG-4 ALS), MPEG-4 Scalable Lossless Coding (MPEG-4 SLS, also used in audio profile HD-AAC), Meridian Lossless Packing (MLP), Monkey's Audio (APE), mp3HD, OptimFROG (OFR), Original Sound Quality (OSQ), RealAudio Lossless, RK Audio (RKAU), Shorten (SHN), TAK, True Audio (TTA), WavPack (VW), Windows Media Audio 9 Lossless, Adaptive Differential (or Delta) pulse-code modulation (ADPCM), Adaptive Rate-Distortion Optimised sound codeR (ARDOR), Adaptive Transform Acoustic Coding (ATRAC), apt-X, Dolby Digital (A/52, AC3), DTS Coherent Acoustics (DTS, Digital Theatre System Coherent Acoustics), Impala FORscene audio codec, ITU standards (G.719, G.722, G.722.1, 0.722.1 Annex C, and G.722.2), MPEG-1 Audio, MPEG-2 Audio, MPEG-4 Audio (Advanced Audio Coding (AAC) Harmonic and Individual Lines and Noise (HILN, MPEG-4 Parametric Audio Coding), TwinVQ, BSAC (Bit-Sliced Arithmetic Coding)), Musepack, Opus, Perceptual audio coder, QDesign, Siren 7, Siren 14, TwinVQ, Vorbis, and Windows Media Audio (WMA).

Examples of voice codecs include but are not limited to: Advanced Multi-Band Excitation (AMBE), Algebraic Code Excited Linear Prediction (ACELP), CDMA compression formats and codecs (Enhanced Variable Rate Codec (EVRC), Enhanced Variable Rate Codec B (EVRC-B), QCELP (Qualcomm Code Excited Linear Prediction), Selectable Mode Vocoder (SMV), Variable Multi Rate-WideBand (VMR-WB)), CELT, Code Excited Linear Prediction (CELP), Continuously variable slope delta modulation (CVSD), Dialogic ADPCM (VOX), Digital Speech Standard (DSS), FS-1015 (LPC-10), FS-1016 (CELP), ITU standards (G.711, G.711.0 (G.711 LLC), G.711.1, G.718, G.719, G.721 (superseded by G.726), G.722 (SB-ADPCM), G.722.1, G.722.2 (AMR-WB), G.723 (24 and 40 kbit/s DPCM, extension to G.721, superseded by G.726), G.723.1 (MPC-MLQ or ACELP), G.726 (ADPCM), G.728 (LD-CELP), G.729 (CS-ACELP), G.729a, G.729d, and G.729.1), GSM compression formats and codecs (Full Rate (GSM 06.10), Half Rate (GSM 06.20), Enhanced Full Rate (GSM 06.60), and Adaptive Multi-Rate (AMR)), Harmonic Vector Excitation Coding (HVXC), Internet Low Bit Rate Codec (iLBC), Improved Multi-Band Excitation (IMBE), internet Speech Audio Codec (iSAC), IP-MR, Mixed Excitation Linear Prediction (MELP), Nellymoser Asao Codec, PT716, PT716plus, PT724, RALCWI (Robust Advanced Low Complexity Waveform Interpolation), Relaxed Code Excited, Linear Prediction (RCELP), RTAudio, SILK, Speex, SVOPC, Triple Rate CODER (TRC), Vector Sum Excited Linear Prediction (VSELP), OpenLPC, Voxware, Truespeech, PDC-HR (PSI-CELP), and Broadcom BroadVoice16/BroadVoice32.

Examples of text codecs include but are not limited to: BiM, Continuous Media Markup Language (CMML), MPEG-4 Part 17. Ogg Kate, Ogg Writ, and ttyrec.

Examples of video codecs include but are not limited to: Alpary, Animation (qtrle), ArithYuv, AVIzlib, CamStudio GZIP/LZO, Dirac lossless, FastCodec, FFV1, H.264 lossless, Huffyuv (or HuffYUV), JPEG 2000 lossless, Lagarith, LOCO, LZO, MSU Lossless Video Codec, PNG, ScreenPressor, SheerVideo, Snow lossless, TechSmith Screen Capture Codec (TSCC), Ut Video, VMNC, YULS, ZMBV (Zip Motion Block Video) Codec, ZRLE used by VNC, Blackmagic codec, Apple Intermediate Codec, Audio Video Standard (AVS), Bink Video, Blackbird FORscene video codec, Cinepak, Dirac, Firebird, H.261 MPEG-1 Part 2 (MPEG-1 Video), H.262/MPEG-2 Part 2 (MPEG-2 Video), H.263, MPEG-4 Part 2 (MPEG-4 Advanced Simple Profile), H.264/MPEG-4 AVC or MPEG-4 Part 10 (MPEG-4 Advanced Video Coding), HEVC, lndeo 3/4/5, OMS Video, On2 Technologies (TrueMotion VP3/VP4, VP5, VP6, VP7, VP8; or TrueMotion S, TrueMotion 2), Pixlet, RealVideo, Snow Wavelet Codec, Sorenson Video, Sorenson Spark, Tarkin, Theora, VC-1 (SMPTE standard, subset of Windows Media Video), VP9 by Google, Windows Media Video (WMV), MJPEG, JPEG 2000 intra frame video codec, Apple ProRes 422/4444, AVC-Intra, DV, VC-2 SMPTE standard (a.k.a. Dirac Pro), VC-3 SMPTE standard, GoPro CineForm, REDCODE RAW, and Grass Valley Codec.

Quality Metrics

The quality of decoded output is generally determined by how well the output reproduces the original, un-encoded data. Many encoding standards are lossy, meaning that the decoded output will not have all the bits that were present in the original, un-encoded data. Even with lossless codecs a decoder may have problems that affect the quality of the decoded data. Quality defects can be detected by a human who is watching or listening to the decoded data. Having a human measure the quality of decoded output, however, is not efficient, and not necessarily accurate or repeatable. Hence, for most testing environments it is desirable to test quality in an automated fashion.

Therefore, decoded data is typically measured against reference data. In an automated system, that reference data may be the encoded data or decoded data that is known to be free of errors. Ideally, a given decoded frame of data-under-test is measured against a reference data frame that is temporally identical, meaning from the same point in time, as the decoded frame-under-test. Various techniques exist to synchronize the decoded data-under-test with the reference data, such as adding special markers to reference frames for identification or attempting to locate significant scene changes in the stream to anchor alignment points. The system described herein attempts to achieve the best synchronization by comparing a given decoded frame-under-test with a window of reference frames from the reference data. The assumption is that one reference frame out of the window will have the best quality measurement out of all frames in the window, which indicates that that reference frame is the synchronization point. Poor synchronization can be indicated by the best quality measurement exceeding a given threshold. While it may be desirable to compare each decoded frame-under-test against each frame of a given window of reference frames, it is understood that the system can be optimized as necessary or desired by taking advantage of the sequential nature of the data.

Various quality metrics exist that can be used to measure the quality of decoded data. Quality metrics are algorithms that operate on the decoded output to produce an objective evaluation of the quality of the data, which reflects the subjective quality that a human might attach to that output. Quality metrics typically calculate a measurement for an entire unit of data, for instance, for an entire video frame. The automatic video comparison system uses variations on existing quality metrics to calculate measurements for sub-units of data, for instance, for sub-blocks of a frame. By calculating at the level of sub-units, the automatic video system can determine, for instance, that the quality in one part of a picture is sufficient, while in another part it is not.

One example quality metric is Peak Signal-To-Noise Ratio (PSNR). PSNR is measured on a logarithmic scale and depends on the mean squared error (MSE) between an original frame and a frame-under test, relative to $(2^n-1)^2$. In the system described herein, PSNR is vector for each sub-unit of a unit of data-under-test. For example, when K is the number of sub-blocks in a decoded frame-under-test; the PSNR vector would be:

$$[PSNR_1, PSNR_2, \ldots, PSNR_K] \text{ where } PSNR_k = 10 \cdot \log_{10} \frac{Max_k^2}{MSE_k}$$

In the above formula, $Max_k$ is the maximum pixel value of the sub-block. $MSE_k$ is given by:

$$MSE_k = \frac{1}{u*v} \sum_{i=0}^{u-1} \sum_{j=0}^{v-1} [T(i, j) - R(i, j)]^2$$

with u, v being the dimensions of the sub-block, T(i, j), being sub-blocks being examined, and R(i, j), the sub-blocks for each reference frame in a window of reference frames that the decoded frame-under-test is being compared against.

Another example quality metric is edge-detection-based image block comparison. In edge-detection-based image block comparison, the set of edge points of a picture block would be identified by calculating the set of pixels where the change in luminosity is above a specified threshold. When the luminosity at each pixel at position (x, y) is represented as a function $f(x, y)$, the magnitude of the gradient $\nabla f$ of that function is a typical measure of the change in intensity at that pixel and is given by:

$$magn(\nabla f) = \sqrt{\left(\frac{\partial f(x, y)}{\partial x}\right)^2 + \left(\frac{\partial f(x, y)}{\partial y}\right)^2}$$

The set of edge pixels identified for a sub-block under test can then be compared against the edge pixels of a reference sub-block using a distance metric such the Euclidean distance or the Manhattan distance measure.

Another example quality metric is histogram-based image block comparison. In histogram-based image block comparison, a vector representing the number of pixels for each tonal value would be computed for each block. The histogram for a sub-block under test can then be compared against a reference sub-block using the Euclidean or the Manhattan distance metric as above.

In another example quality metric, a quality measurement is produced for each block of the at least one decoded video frame. Next a determination is made for each block the quality metric by indicating which of the at least one window of reference video data in the frame has a comparatively best quality measurement. The best quality measurement is made up of a measured vector where a block of the frame that has the largest PSNR is the smallest among the reference frames. Which reference video data frame that has the comparatively best quality measurement can be made in accordance with a quality metric M that is expressed mathematically as follows.

$$M = \min_{w=1}^{W} \max_{k=1}^{K} (PSNR_k)$$

for $K$ components and a comparison window of $W$.

In another example of a quality metric determination, the quality measurement for each video frame of a test-video sequence is based on the minimization of the maximum difference between corresponding elements of the PSNR vector (or other block quality metric vectors) of that frame and the PSNR vectors of the reference frames in a particular window. In one embodiment of this example, the worst difference of each corresponding element of the PSNR vector (or any other image block quality vector) between the blocks of the at least one decoded video frame and the at least one reference video frame is obtained according to the measurement mathematically expressed as:

$$M = \operatorname*{MinMax}_{w=1}^{W} \operatorname*{Max}_{k=1}^{K} QM_{wk}$$

where $QM_{wk}$ is the block difference between block k of a decoded video frame and block k of the w-th reference frame in a specified widow. $QM_{wk}$ can be any image block quality vector including $PSNR_{wk}$ or the block image quality measures listed in the application.

Another example quality metric is image block structural similarity comparison. In this approach the structural similarity (SSIM) index between a sub-block under test and a reference block would be computed. The typical measure for this value is described in Z. Wang, A. C. Bovik, H. R. Sheikh, and P. Simoncelly, "Image Quality Assessment: From Error Visibility to Structural Smilarity," IEEE Trans. Image Processing, vol. 13, no. 4, Apr. 2004, incorporated herein by reference in its entirety. Using this typical measure, the SSIM index between two sub-blocks t and r would then the product of the luminance similarity l(t, r), the pixels patch contrasts similarity c(t, r), and the pixels patch structures similarity s(t, r) is given by:

$$S(t, r) = l(t, r) \cdot c(t, r) \cdot s(t, r) = \left( \frac{2\mu_t \mu_r + C_1}{\mu_t^2 + \mu_r^2 + C_1} \right) \cdot \left( \frac{2\sigma_t \sigma_r + C_2}{\sigma_t^2 + \sigma_r^2 + C_2} \right) \cdot \left( \frac{\sigma_t \sigma_r + C_1}{\sigma_t \sigma_r + C_1} \right)$$

where $\mu_t$ and $\mu_r$ are the means luminance of blocks t and r, $\sigma_t$ and $\sigma_r$ are the standard deviations of the blocks luminance values, and $\sigma_t \sigma_r$ is the cross correlation of the luminance values between the blocks. $C_1$, $C_2$, $C_3$ are small constants chosen to avoid numerical instability in the calculations as described in Wang, referenced above.

The quality metrics described here are given by way of example and not limitation. The automatic video comparison system described herein is operable with any suitable quality metric for measuring either video, audio, graphics, or text or any combination thereof.

The quality metrics described here are given by way of example and not limitation. The automatic video comparison system described herein is operable with any suitable quality metric for measuring either video, audio, graphics, or text or any combination thereof.

Distributed Computing Systems

As stated above, processing decoded data to measure its quality is computationally intensive. In order to increase the efficiency of this processing, the automatic comparison system described herein divides and distributes the computations to a distributed computing system that is capable of many parallel, independent computations.

A distributed computing system may comprise computer networks where individual computers are physically distributed within some geographical area. A distributed computing system may also comprise autonomous processes that run on the same physical computer and that are capable of interacting with each other by message passing. Thus, a distributed computing system may be generally described as a system with one or more autonomous computational entities (referred to herein as compute resources). Typically, a distributed computing system can tolerate the failures in individual entities, and the structure of the system (network topology, network latency, number of computers), may not be known in advance, and may not need to be known in advance. The system may consist of different kinds of computers and network links, and may change during the execution of any given distributed computation. Typically, each compute resource may have only a limited, incomplete view of the whole system, and may know, and be only required to know, only part of the input.

Distributed computing systems can be used to solve large computational problems. Large computational problems can be solved by a single computational entity, but such entity can either be costly, such as a supercomputer, or impractically slow, such as a typical desktop computer. A distributed computing system is capable of using less powerful and less expensive computational entities by dividing a large computation into smaller computations that can be executed in parallel, and distributing those smaller computations across available compute resources. Thus a distributed computing system may provide capabilities that formerly were only possible with costly systems.

Automatic Comparison with Decoded Frames

Certain embodiments will now be described to provide an overall understanding of the principles of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present invention.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

For simplicity, the following description may refer to frames of data, which is to be understood to include frames of video data. The use of term frames, however, is by way of example only, and it is understood that the data operated on can be video, audio, text or any combination thereof.

FIG. 1A depicts one embodiment of an automatic video comparison system. The video comparison system in the illustrated embodiment includes encoded data 1, a decoder device-under-test (DUT) 2, a video comparison controller 3, a network gateway 7, and a distributed computing system 5. The encoded data 1 is video and/or audio data that is encoded using the codec that is implemented by the decoder device-under-test. Typically, the encoded data 1 has been certified as conforming to the standard defined by the codec. In the illustrated embodiment, the encoded data 1 is delivered to both the decoder device 2 and the video comparison controller 3. The decoder device 2 decodes the encoded data 1 to produce decoded data-under-test 4. The decoded data-under-test 4 is also delivered to the video comparison controller 3. The video comparison controller 3 controls the automatic video comparison system be subdividing the operations required to measure the quality of the decoded data-under-test 4 into smaller operations, issuing those smaller operations across the distributed computing system 5, collecting the results of those smaller operations, and compiling and reporting the results. The video comparison controller 3 generates reference data 21 from the encoded data 1, and divides the decoded data-under-test 4 and the reference data 21 into approximately temporally corresponding segments, and issues the segments to the distributed computing system 5 for processing by the compute resources 6, as described in further detail below with reference to FIG. 2. In the embodiment illustrated in FIG. 1A, the video comparison controller 3 communicates with a network gateway 7 which provides a network connection 8 to the distributed computing system 5. The distributed computing system 5 operates on the data segments generated by the video comparison controller 3 and returns quality metrics for each decoded data frame, as described in further detail below. The video comparison controller 3 optionally reassembles the quality metrics and generates reports 10 for the quality of the decoded data-under-test 4.

Figure 1B:
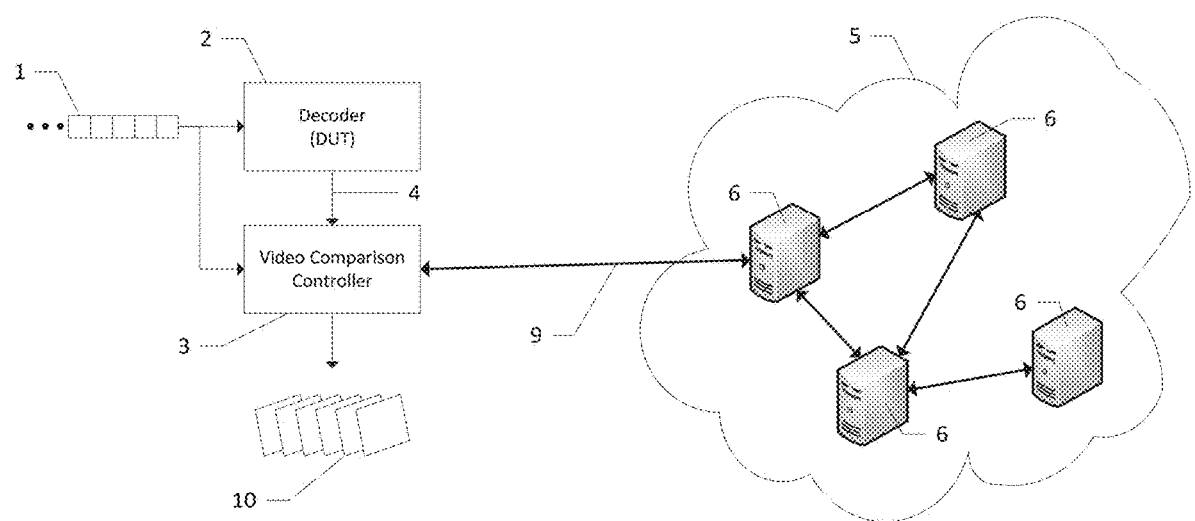
FIG. 1B illustrates another embodiment of an automatic video comparison system.

FIG. 1B depicts another embodiment of an automatic video comparison system. The embodiment illustrated by FIG. 1B is similar in all aspects to the system of FIG. 1A except that in the embodiment illustrated by FIG. 1B the video comparison controller 3 is capable of direct communication 9 to the distributed computing system 5, and does not require the network gateway 7.

Figure 2:
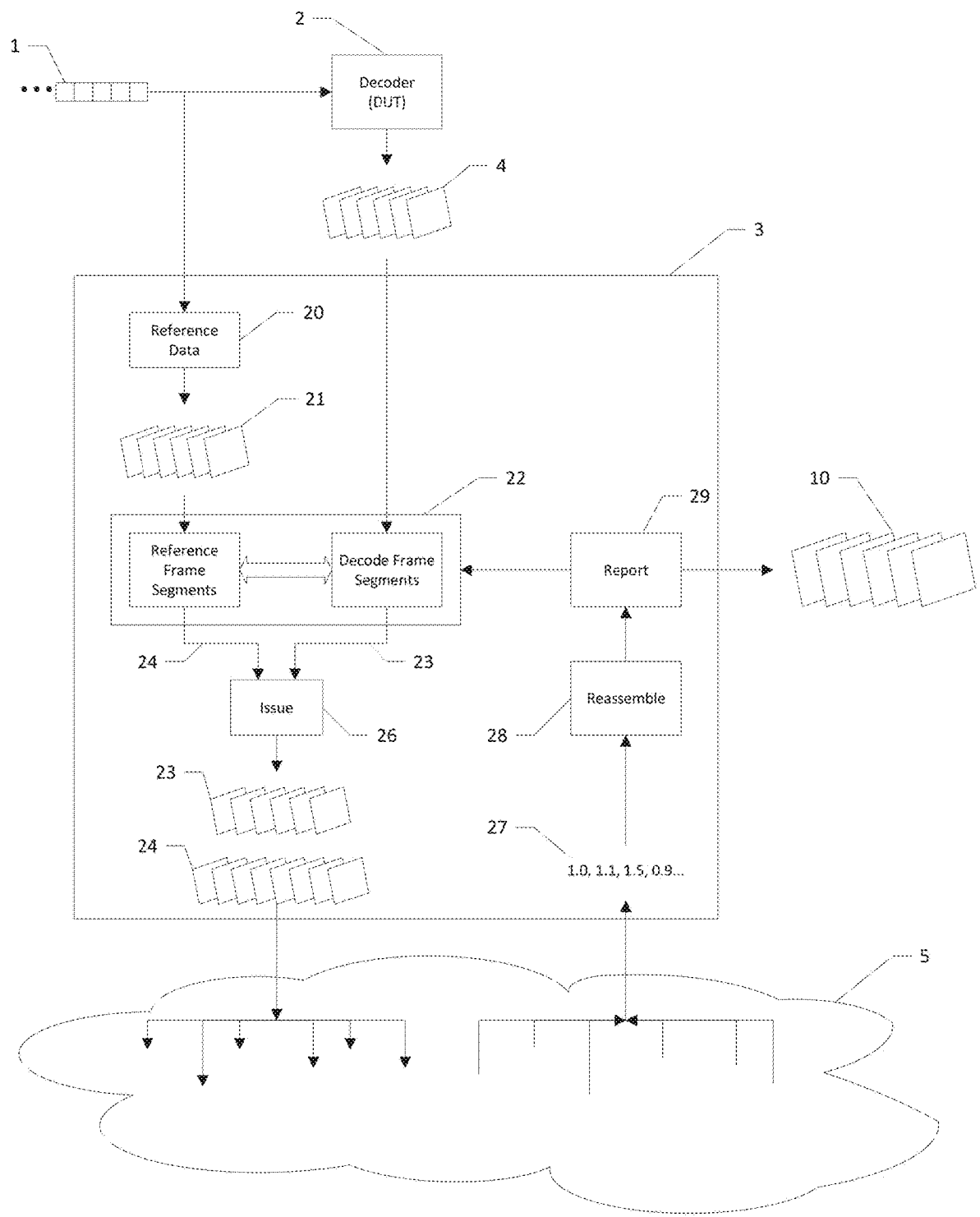
FIG. 2 illustrates an operational embodiment of a video comparison controller.

FIG. 2 illustrates one embodiment of the operation of video comparison controller 3. As described above, the encoded data 1 is delivered to decoder the device-under-test 2. The device-under-test 2 decodes the encoded data 1 and produces the decoded data-under-test 4. The decoded data-under-test 4 is delivered to the video comparison controller 3.

The encoded data 1 also is delivered to the video comparison controller 3 where the video comparison controller 3 processes the encoded data 1 using a reference data generation process 20 and produces the reference data 21. In the example embodiment of FIG. 2, the reference data generation process 20 decodes the encoded data 1, using a decode algorithm derived from the same codec employed by decoder device-under-test 2, to produce the decoded reference data 21.

Figure 4:
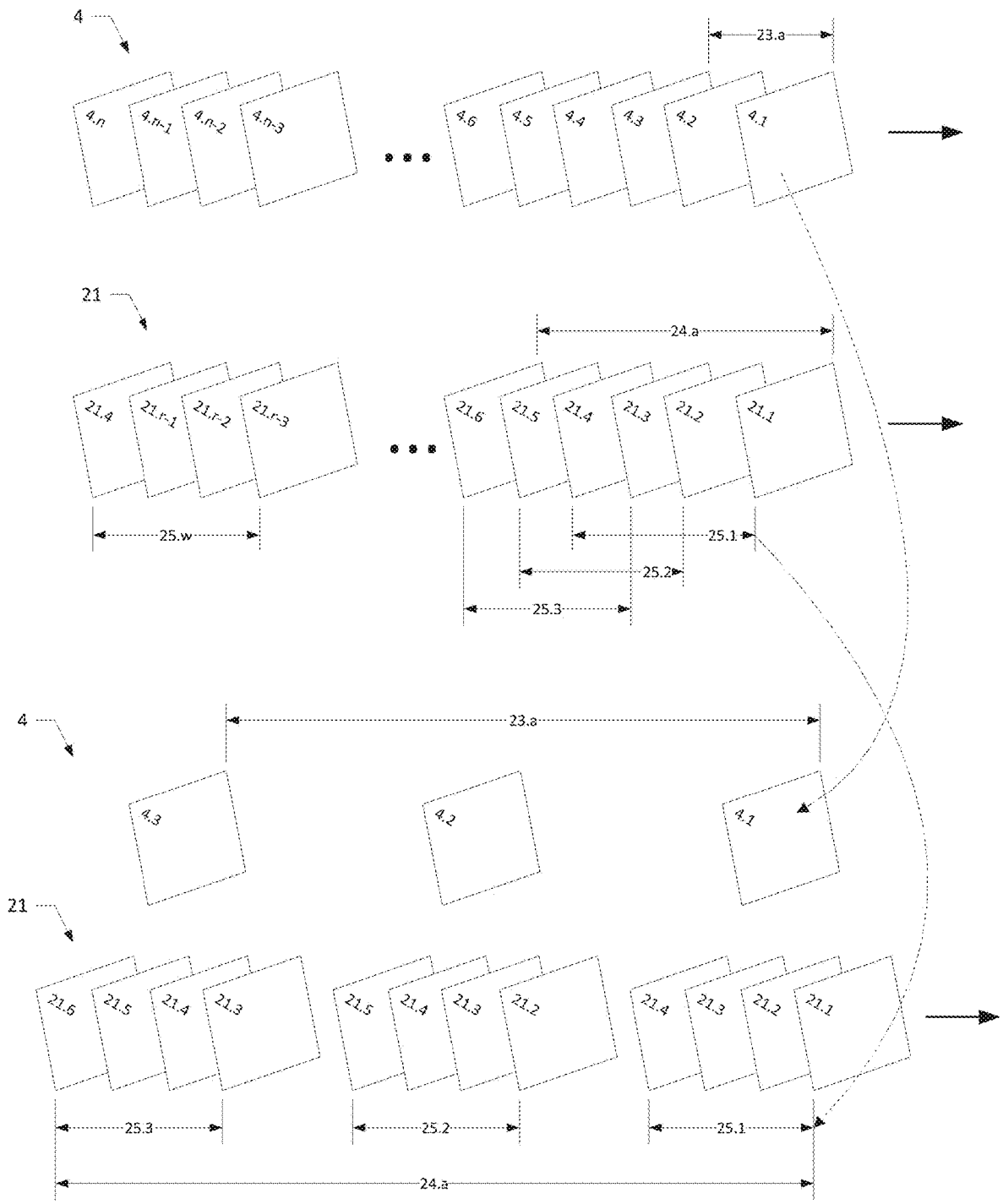
FIG. 4 illustrates one embodiment of a process of generation of decode data segments, reference data segments, and windows of reference frames.

In the coordination process 22, the video comparison controller 3 divides the decoded data-under-test 4 into the decode data segments 23 and divides the reference data 21 into the reference data segments 24 that are approximately temporally corresponding to decode the data segments 23. By approximately temporally corresponding is meant that the span of time encompassed by a segment of the reference data 24.$a$ as illustrated in FIG. 4 is approximately the same as the span of time encompassed by a segment of decode data 23.$a$. By using a reference data segment 24.$a$ that approximately temporally corresponds to a decode data segment 23.$a$ coordination of the process 22 attempts to achieve the best synchronization between the decode data-under-test 4 and the reference data 21. The coordination process 22 is not required to guarantee temporal correspondence, however; it may estimate temporal correspondence, and make adjustments as described in further detail below. The coordination process 22 will divide all of the decode data-under-test 4 into the decode data segments 23 so that each frame from decode data-under-test will be analyzed, unless or until the process 22 is interrupted.

The length of the decoded data segments 23 can be determined according to any appropriate method, such as but not limited to segments of equal length, segments of varying lengths, segment lengths determined by the processing capabilities distributed computing system 5, and/or segment lengths determined by the overall load on distributed compute system 5 or load on the individual compute resources 6. The length of a decoded data segment 23.$a$ can be as few as a single frame and/or as many as the length of the all the frames of the decoded data-under-test 4. The length of a reference data segment 24.$a$ can be the same, greater than, or less than the length of the approximately temporally corresponding decode data segment 23.$a$. The length of the reference segment has to be greater than the segment under test for the scheme to work. Preferably, a reference data segment 24.$a$ is at least the same length as its approximately temporally corresponding decode data segment 23.$a$.

Each decoded data segment 23.$a$ and its approximately temporally corresponding reference data segment 24.$a$ are issued 26 to available compute resources 6 in distributed computing system 5. The video comparison controller 3 is generally aware of what compute resources 6 are available and which decoded data segments 23 and reference data segments 24 have been issued to each compute resource 6. The video comparison controller 3 also may be aware of the compute capabilities of each compute resource 6—including how fast or slow it is capable of processing, how much memory it has, etc.—and how heavily loaded each of the compute resource 6 is at any given time. The video comparison controller 3 thus may be capable of balancing the overall workload on the distributed computing system 5.

The compute resources 6 determine the quality measurements 27 for each frame of the decoded data-under-test 4.*r* as illustrated in FIG. 4, as described in further detail below with respect to FIG. 3. With reference back to FIG. 2, the compute resources 6 return the quality measurements 27 to the video comparison controller 3. It is possible that the compute resources 6 return the quality measurements 27 at varying times with respect to each other and with respect to the order in which the decode data segments 23 were issued. Thus it may be necessary for the video comparison controller 3 to reassemble 29 the quality measurements 27 from various decode data segments 23 to return them to sequential order. Reassembling the quality metrics for the decode data segments 23 is not strictly necessary, however, doing so may aid in processing the quality reports 10.

Figure 5:
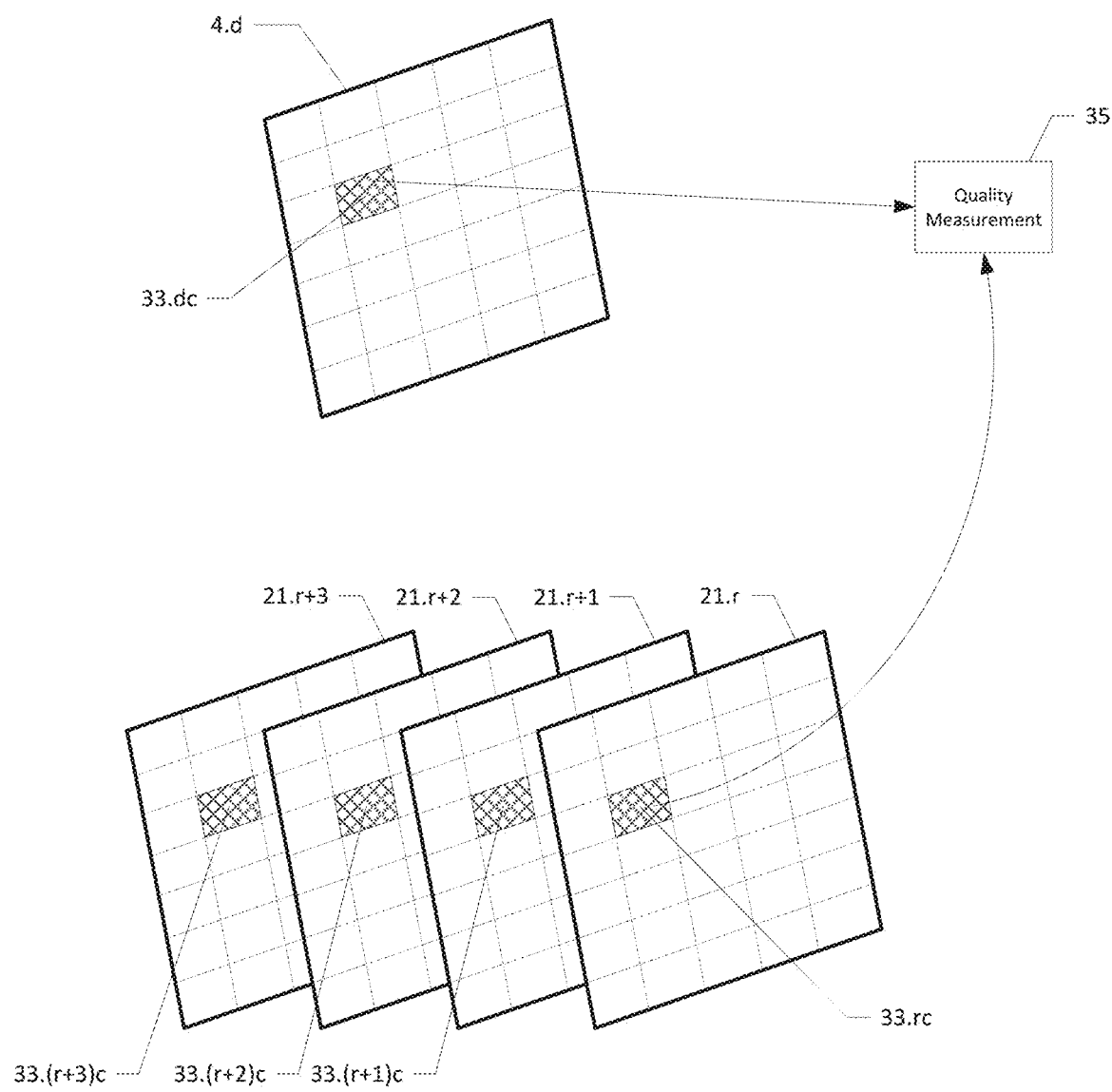
FIG. 5 illustrates one embodiment of a process of selection and measurement of comparison units.

The reporting process 29 is capable of generating the quality reports 10. The reporting process 29 also may be capable of examining the quality measurements 27.*d* for each frame of the decoded data-under-test 4.*d* as illustrated in FIG. 5. By examining the quality metrics for each frame of the decoded data-under-test 4.*d*, the reporting process 29 can, for instance, detect quality measurements 27 that exceed a specific threshold. The quality measurements 27 that exceed a specific threshold may indicate that a decoded frame-under-test 4.*d* is either missing, corrupted, or otherwise problematic. The video comparison controller 3 can be configured to raise an alert or record a notification for these decoded frames-under-test 4. Alternatively and optionally, a compute resource 6 can determine that the quality measurements 27.*d* for a frame of the decoded data-under-test 4.*d* exceed a specific threshold, and report this information to the video comparison controller 3.

The reporting process 29 also may be configured to track which reference frames 21 were measured as best-matching for which decoded frames-under-test 4. Tracking which reference frames 21 best-matches which decoded frames-under-test 4 would allow the video comparison controller 3 to determine that some reference frames 21 were never matched, possibly indicating that a frame was dropped from the decoded data-under-test 4, or some other defect. The video comparison controller 3 also would be able to determine that the reference frame 21 was matched more than once, possibly indicating duplicate frames in the decoded data-under-test 4.

Reporting process 29 can also report results to coordination process 22. Coordination process can optionally use the quality measurements 27 to attempt to improve the temporal synchronization between decode data segments 23 and reference data segments 24. Coordination process 22 can optionally also be configured to retry decode frames-under-test 4 or decode data segments 23 that had quality measurements that were sub-optimal. By retry is meant that video comparison controller 3 will issue 26 decode frames-under-test 4 or decode data segments 23 to distributed computing system 5 a second, third, or fourth, etc. time.

The quality reports 10 may be formatted such that they are human-readable. The quality reports 10 also may be formatted in a manner that is convenient for later operation, such as but not limited to binary format, ASCII format, database format, etc.

Figure 3:
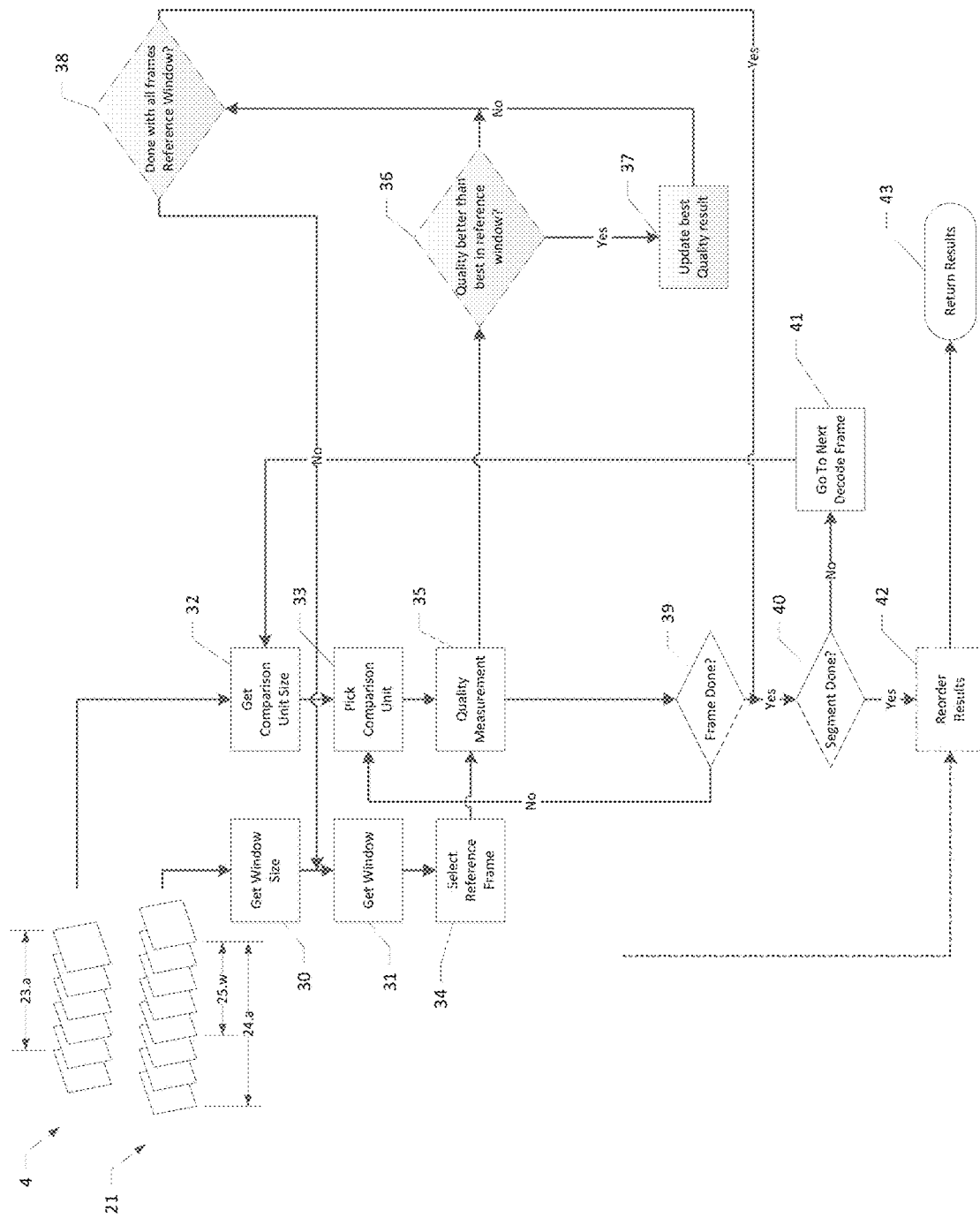
FIG. 3 illustrates one embodiment of a process executed by a compute resource in determining quality measurements for decoded data-under-test.

FIG. 3 illustrates in further detail one embodiment of a process executed by the compute resource 6 in determining the quality measurements 27 for the decoded data-under-test 4. The compute resource 6 receives a decoded data segment 23.*a* and an accompanying approximately temporally corresponding reference frame segment 24.*a*. For each decoded frame-under-test 4.*d* from the decoded data segment 23.*a*, the compute resource 6 attempts to find the best matching reference frame 21.*r* from a window of frames 25.*w* from the reference frame segment 24.*a*. To accomplish this, the compute resource 6 determines 30 the size of the window of frames 25.*w* it may use for a given decode frame-under-test 4.*d*. The number of frames may be pre-set by the video comparison controller 3, by some other system in communication with the compute resource 6, by instructions pre-loaded into the compute resource 6, or may be delivered to the compute resource 6 along with the decode data segment 23.*a* and the reference frame segment 24.*a*. The number of frames may be a fixed value, a value that changes for each of the decode data segment 23 or the decode frame-under-test 4, a value that changes based on the quality measurements 27 for a preceding frame, or any variable value determined by a suitable algorithm.

Once the compute resource 6 has determined what the size of the window of the reference frames 30, the compute resource 6 selects 31 the window of the reference frames 25.*w* from the reference frame segment 24.*a*. The window of reference frames 25.*w* for any given decode frame-under-test 4.*d* changes temporally, on the assumption that each subsequent decode frame-under-test 4.*d*+n is temporally later than the preceding decode frame-under-test 4.*d*, as shown in FIG. 4, for example. Continuing with FIG. 3, compute resource 6 measures 35 a given decode-frame-under-test 4.*d*, as described in further detail below, against one or more of the reference frames 21.*r* in the window of reference frames 25.*w*.

The compute resource 6 determines 32 the comparison unit size. The comparison unit size is the minimum number of pixels, bits, bytes, words, or other data unit represented by decoded frame-under-test 4.*d* for which the compute resource 6 will generate a quality measurement 27.*d*. The comparison unit has a size N units wide by M units high, such as for example N pixels by M pixels, where N×M can be as small as one unit and as large as the entire frame. The comparison unit size may be pre-set by the video comparison controller, by some other system in communication with the compute resource 6, by instructions pre-loaded into the compute resource 6, or may be delivered to the compute resource 6 along with the decode data segment 23.*a* and the reference frame segment 24.*a*. The size of the comparison unit may be a fixed value, a value that changes for each of the decode segments 23 or each of the decode frames-under-test 4, a value that changes based on the quality measurements 27 for a preceding frame, or any variable value determined by a suitable algorithm. Preferably, but not necessarily, the comparison unit size is such that decode frame-under-test 4 can be divided into equally-sized comparison units. The size of comparison units can possibly also vary for any given decoded frame-under-test r.d.

Once the compute resource 6 has determined the comparison unit size, it measures the quality of a given decode frame-under-test 4.*d*. To do so, the compute resource 6 selects 33 a comparison unit 33.*c* from the decode frame-under-test 4.*d* to measure. The compute resource 6 then selects 34 a reference frame 21.*r* from the window of reference frames 25.*w* that it selected at step 31. The compute resource 6 measures 35 the comparison unit 33.*c* from decode frame-under-test 4.*d* against the corresponding comparison unit 33.*c* in the reference frame 21.*r* using a quality metric as described above. By corresponding is meant that the location within both the decode frame-under-test 4.*d* and reference frame 21.*r* of the comparison unit 33.*c* is the same as shown in FIG. 5, for example. Returning to FIG. 4, in making the measurement 35 the compute resource 6 may use the quality measurement 27.*drc* for the first selected reference frame 21.*r* to continue. Alternatively, the compute resource 6 can determine 35 a quality measurement 27.*d(rn)c* for each reference frame 21.*r* through 21.*rn* in the selected window of reference frames 25.*w*, and change 34 the selected reference frame 21.*r* to the reference frame 21.*rn* that had the best quality measurement.

The compute resource 6 can optionally examine 36 a quality measurement 27.*drc* derived from the determination 35 (measurement) and determines when it is better than the best reference window threshold. This threshold may be pre-set by the video comparison controller 3, by some other system in communication with the compute resource 6, by instructions pre-loaded into the compute resource 6, or may be delivered to the compute resource 6 along with the decode data segment 23.*a* and the reference frame segment 24.*a*. The threshold may be a fixed value, a value that changes for each of the decode data segments 23 or decode frames-under-test 4, a value that changes based on the quality measurements 27 for a preceding frame, or any variable value determined by a suitable algorithm. When the quality measurement 27.*drc* exceeds the threshold, an update of the best quality result is made in 37 and then the process proceeds to 38 to determine if all frames of the reference window have been considered.

When the quality measurement 27.*drc* does not exceed the threshold, the compute resource 6 proceeds to determine 39 whether all the comparison units 33 of the current decode frame-under-test 4.*r* have been measured. When not, the compute resource 6 returns and selects 33 another comparison unit 33.*cn*. The compute resource 6 can select the comparison units 33 in any suitable order, including raster scan order, reverse raster scan order, random, an order determined by the quality measurement 27.*drc* of the previous comparison unit 33.*c*, or some other order determined by a suitable algorithm.

When the compute resource 6 determines 39 that it is done with the current decode frame-under-test 4.*r*, the compute resource 6 determines 40 whether all the decode frames 4 in the decode data segment 23.*a* have been measured. When not, the compute resource 6 advances 41 to the next decode frame-under-test 4.*r*+1. Preferably, the compute resource 6 operates on each decode frame 4 of decode data segment 23.*a* in sequential order, but the compute resource 6 may choose to skip any number of the decode frames 4, or select he decode frames 4 in any order, for any reason. Once the compute resource 6 has advance to the next decode-frame 4.*r*+1, the compute resource 6 begins again with steps 30 and 32. Optionally, when it is configured to do so, the compute resource 6 can instead begin selecting 31 the window of the reference frames 25.*w* from the reference frame segment 24.*a* and selecting 33 the comparison unit 33.*c* from the decode frame-under-test 4.*d* to measure. Upon returning to selecting 31 the window of the reference frames 25.*w* from the reference frame segment 24.*a*, the compute resource 6 can select the next window of the reference frames 25.*w*+1 by simply advancing the window by one reference frame 21.*r*. Alternatively, the compute resource 6 can optionally attempt to improve the quality measurements 27 for decode frame under test 4.*r*+1 by advancing the window of the reference frames 25.*w*+1 more than one frame, not advance the window of reference frames 25.*w*+1, or moving the window of reference frames 25.*w*+1 backwards in time. The compute resource 6 can optionally attempt to increase efficiency 34 by using the quality measurements from any preceding decode frame-under-test 4.*d-n* to select which reference frame 21.*r* from the window of reference frames 25.*w*+1 to begin with. Alternatively, the compute resource 6 can select reference frames 21 in sequential order or in random order.

When the compute resource 6 determines 40 that it is done with the current decode data segment 23.*a*, the compute resource 6 may proceed to reorder 42 the quality measurements 27.*dr* for a given decode frame-under-test 4.*d*, when the compute resource 6 is configured to select comparison units in some order other than raster scan order. The compute resource 6 also may reorder 42 the quality measurements 27 for each of the decode frames-under-test 4, when the compute resource 6 is configured to select 41 the decode frames-under-test 4 in some order other than sequential. Reordering in raster scan and/or sequential order are only an option; the compute resource 6 can reorder 42 the quality measurements in any suitable order.

The compute resource 6 returns 43 the quality measurements 27 to the video comparison controller 3. The compute resource 6 can return quality measurements 27 as soon as any quality measurements 27 are ready, send quality measurements 27 for each decoded frame-under-test 4, or send quality measurements for each decode data segment 23.*a*, as appropriate.

FIG. 4 illustrates in further detail one embodiment of a generation of decode data segments 23, reference data segments 24, and windows of reference frames 25. The decoded data-under-test 4 comprise a number of frames 4.1 through 4.*n*. The coordination process 22, illustrated in FIG. 2, selects some number of sequential frames from the decoded data-under-test 4 to generate a decode data segment 23.*a*, here illustrated as comprising frames 4.1 through 4.3. The coordination process 22 can generate another segment 23.*a*+1 of decoded data-under-test 4 starting at frame 4.4, of the same or different length. This process of generating decode data segments 23 can be repeated for the entire length of decoded data-under-test 4.

The coordination process 22 also selects some number of sequential frames from the reference data 21 to generate a reference data segment 24.*a*. Since the reference data 21 is generated from the same encode data 1 from which the decode data-under-test 4 is generated, the reference data segment 24.*a* can be selected to be approximately temporally corresponding to the decode data segment 23.*a*. The coordination process 22, however, is not required to know how well the decode data-under-test frames 4 are temporally synchronized with the reference data frames 21. Hence, the coordination process 22 can choose to make the reference data segment the same length or longer than decode data segment, or even shorter.

The compute resources 6, or optionally the coordination process 22 or some other process within the video comparison controller, selects windows of the reference frames 25, here illustrated as 25.1, 25.2, and 25.3. A window of the references frames 25.*w* comprises some number of sequential reference frames 21, such as frames 21.1 through 21.4, as illustrated here. A window of reference frames 25.*w* may be generated for each decoded frame-under-test 4, as illustrated in the lower portion of FIG. 4. Still with reference to FIG. 4, optimally, though not necessarily, a reference frame 21.*r* from a window of reference frames 25.*w* best matches the decoded frame-under-test 4.*d* associated with that window of the reference frames 25.*w*, where a best match is determined by the quality measurement computed by the compute resources 6, using a quality metric. Because the best-matching reference frame 21.*r* for a given decode data frame 4.*d* may be temporally before, after, or the same as the best-matching reference frame 21 for a preceding decode data frame 4.*d-n*, different windows of reference frames 25 may overlap. Windows of reference frames 25.*w* for any given reference data segment 24.*a* may be of the same or different lengths.

FIG. 5 illustrates in greater detail one embodiment of selection and measurement of comparison units 33. In the example illustrated by FIG. 5, the comparison unit size has been selected such that decode frame-under-test 4.*d* has been divided into five units wide by seven units high. In this example, the comparison unit 33.*dc* has been selected for quality measurement 35. The comparison unit 33.*dc* is measured against the corresponding comparison unit 33.*rc* from example reference frame 21.*r*. By corresponding is meant that the comparison unit 33.*rc* is in the same location, meaning same units across and same units high, as comparison unit 33.*dc*. In some but not all cases comparison unit 33.*dc* could be compared against comparison units 33.(*r*+1)*c*, 33.(*r*+2)*c*, and 33.(*r*+3)*c* in reference frames 21.*r*+1, 21.*r*+2, and 21.*r*+3, respectively.

Figures 6A, 6B:
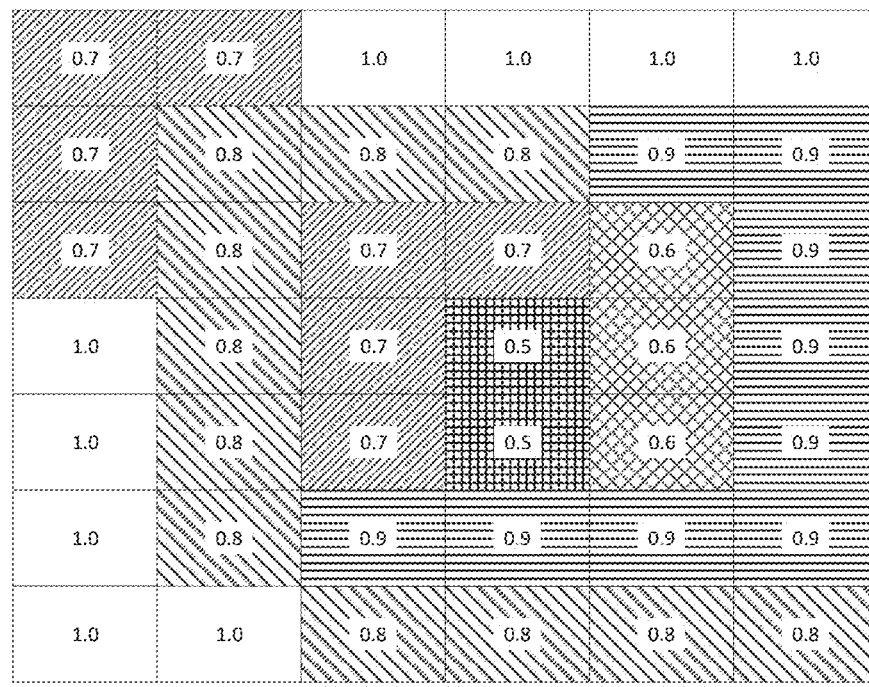
FIG. 6A illustrates one embodiment of a process displaying quality measurements in a human-readable format.
FIG. 6B illustrates another embodiment of displaying quality measurements in a human-readable format.

FIG. 6A illustrates one embodiment of displaying a quality report 10 in a human-readable format. For the automatic system for video comparison to displaying quality reports 10 in human-readable format is optional; in most cases, it will be sufficient for the system to determine that the decoded data-under-test 4 had or did not have adequate quality measurements 27. In cases where a decoded data-under-test 4 did not have adequate quality measurements, it may be desirable to examine the specific quality measurements 27 found to be inadequate. In such cases, it may be desirable to display quality reports 10 in human-readable format.

The example embodiment of FIG. 6A illustrates a human-readable display of the quality measurements 27 for a single decode frame-under-test 4.*d*. The illustrated decode frame-under-test 4.*d* has been divided into its individual comparison units 33. The quality measurement 27.*dc* for each comparison unit is displayed at the location of each comparison unit 33.*c*.

FIG. 6B also illustrates one embodiment of displaying quality measurements 27 for a single decode frame-under-test 4.*d* in a human-readable format. In this example embodiment, each of the comparison units 33.*c* has been shaded in accordance with how close its quality measurement 27.*dc* approaches or exceeds a threshold value. It is understood that the examples illustrated by FIGS. 6A and 6B can be combined, and that the human-readable display illustrated can be fully interactive.

It is understood that the operations described with regard to any of the above figures need not be conducted in series, and that where possible the operations can be executed in parallel. For example, decoder-under-test 2 is not required to decode the entire encode data 1 stream before decode data-under-test 4 is handed to video comparison controller 3. Similarly, quality measurement step 35 can optionally operate on multiple comparison units 33 at the same time.

It is also understood that division of operations between the video comparison controller 3 and the compute resources 6 in the distributed computing system 5 is by way of example only. Any or all of the operations illustrated as being executed by a compute resource 6 can be instead conducted by the video comparison controller 3, as appropriate.

It is also understood that the example embodiment is described in terms of having a single video comparison controller 3. It is understood that the video comparison controller 3 can consist of one or more hardware modules, one or more software modules, or any combination thereof.

Automatic Comparison with Prediction Information

An alternate optional embodiment for the automatic video comparison system uses an alternate method to generate reference data to compare the decoded data-under-test against. This method can be applied to codecs that use predictive coding to avoid the step of decoded the encoded input data stream, and thus reduce the number of computations required, as well as additional potential sources of errors and uncertainties.

Codecs that use predictive coding employ encoders that create a prediction of a region of the current frame base on a previous (or future) frame and subtracts this prediction from the current region to form a residual. If the prediction was successful, the energy in the residual is lower than in the original frame and the residual can be represented with fewer bits. In a similar way, a prediction of an image sample or region may be formed from previously-transmitted samples in the same image or frame.

Referring again to FIG. 2, in this example embodiment the video comparison controller 3 extracts 20 the prediction information for each sub-block of each encoded frame 1.*e* to produce the reference prediction information 21. For each sub-block of a given encoded frame 1.*e*, the video comparison controller 3 also determines 20 which sub-block of which other encode frame 1.*en* the given sub-block was predicted on, and passes this information with the prediction information for an encoded frame 1. The video comparison controller 3 also will send the differences in the prediction as part of the prediction information.

Referring now again to FIG. 3, in this example embodiment the comparison unit size selected 32 may be determined by the size of the sub-block that is predicted upon.

In this example embodiment, the quality measurement at step 35 may determine how well a comparison block 33.*dc* from a decoded frame-under-test 4.*d* matches the prediction information for a corresponding comparison block 33.*dr* from the reference frame.

Figure 7:
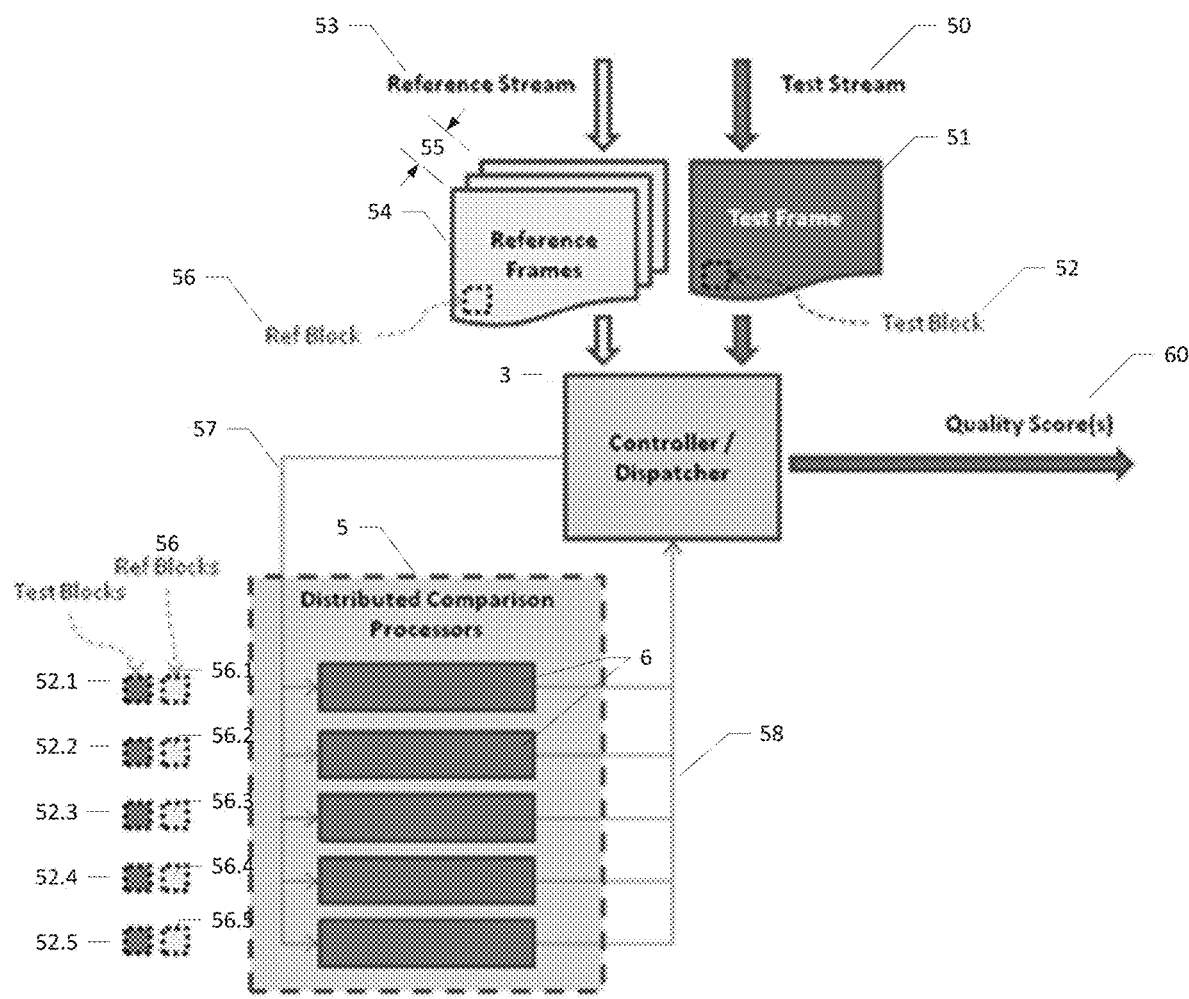
FIG. 7 illustrates an example embodiment of a method for the automatic video comparison system.

Referring now to FIG. 7, FIG. 7 illustrates an example embodiment of a method for the automatic video comparison system. In FIG. 7, a test stream 50 is a stream of data-under-test for which the automatic video comparison system is to generate a quality score 60. The test stream 51 is generally divided into test frames 51, which represent a frame of data. Each test frame 51 is delivered to the video comparison controller 3, described above. A reference stream 53 is also provided to the video comparison controller 3. The reference stream 53 is generally divided into reference frames 54, which represent a frame of reference data. The reference stream 53 is the data against which the test stream 50 is compared to generate the quality score 60. A given test frame 51 is compared against a window of reference frames 55 where the reference frames 54 in the window 55 are temporally preceding and following the given test frame 51. The video comparison controller 3 maintains the window of reference frames 55, and adjust the temporal span of the window 55 for each given test frame 51.

The test frames 51 can further be subdivided into test blocks 52. Reference frames 54 can also be subdivided into reference blocks 56, where a reference block 56 is spatially corresponding to a given test block 52. As described above, each reference block 56 can be prediction information extracted from an encoded video stream. It can be appreciated that the reference frames 54 can also be generated by decoding an encoded video stream, such that the reference blocks 56 are blocks of reference decoded data.

Each test block 52 is to be compared against the spatially corresponding reference block 56 from each of the reference frames 54 within a window of reference frames 55; the reference frame 54 whose reference block 56 best matches the given test block 52 is presumed to be the best-matching reference frame, and this reference frame 54 will be used to generate the quality score 60. To determine which reference frame 54 from a window of reference frames 55 is the best matching, the video comparison controller 3 issues 57 test blocks 52 and spatially corresponding reference blocks 56 to the distributed computing system 5, where compute resources 6 compare a test block 52.$n$ against a reference block 56.$n$. In some embodiments, test blocks 52.1 through 52.5 can be different test blocks 52 from the same given test frame 51, and reference blocks 56.1 through 56.5 are spatially corresponding reference blocks 56 from one reference frame 54 from the window of reference frames 55. In some embodiments, test blocks 52.1 through 52.5 can be the same test block 52, while reference blocks 56.1 through 56.5 are spatially corresponding reference blocks 56 from different reference frames 54 within the window of reference frames 55. The video comparison controller 3 can be capable of issuing 57 test block 52 and reference block 56 pairs to compute resources 6 in various other combinations, and these combinations are given by way of example only. Likewise, FIG. 7 illustrates five compute resources 6 capable of operating independently and in parallel by way of example only; distributed computing system 5 may have any number of compute resources, as required.

Each test block 52 and reference block 56 is compared by a compute resource 6. The compute resource 6 returns a comparison result 58 to the video comparison controller 3. The video comparison controller 3 is operable to collect the results 58 for all test blocks 52 of a given test frame 51 and generate a quality score 60 for the test frame 51. The video comparison controller 3 can also be operable to generate a quality score for multiple test frames 51.

While various details have been set forth in the foregoing description, it will be appreciated that the various aspects of the automatic video comparison of the output of a video decoder may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is worthy to note that any reference to "one aspect," "an aspect," "one embodiment," or "an embodiment" means that a particular feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

Some or all of the embodiments described herein may generally comprise technologies for various aspects of the automatic video comparison of the output of a video decoder, or otherwise according to technologies described herein. In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. Those skilled in the art will recognize, however, that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

What is claimed is:

1. A method for automatic detection of the quality of a decoded video stream, the method comprising:
   receiving an encoded video stream;
   decoding the encoded video stream into a decoded video stream, the decoded video stream comprising at least one decoded video frame;
   producing a reference video data stream from the encoded video stream, the reference video data stream comprising at least one window of reference video data, the at least one window of reference video data comprising corresponding blocks of reference video data frames;
   comparing the at least one decoded video frame with the at least one window of reference video data by comparing blocks of each of the at least one decoded video frame with the corresponding blocks of reference video data frames from the at least one window of reference video data, with the at least one decoded video frame and the blocks of reference video data frames having misaligned synchronization;
   producing a quality measurement for each block of the at least one decoded video frame using a quality metric to indicate the amount of misaligned synchronization; and
   determining for each block of the at least one decoded video frame the quality metric by indicating which of the at least one window of reference video data in the frame has a comparatively best quality measurement,
   wherein the best quality measurement comprises a measured vector where a block of the frame that has the largest Peak Signal-To-Noise Ratio (PSNR) is the smallest among the reference video frames.

2. The method of claim 1, wherein determining, for each decoded video frame, which reference video data frame from the at least one window of reference video data has comparatively the best quality measurements in accordance with the quality metric M is mathematically expressed as:

$$M = \min_{w=1}^{W}\max_{k=1}^{K}(PSNR_k)$$

for $K$ components and a comparison window of $W$.

3. The method of claim 1, comprising determining the quality metric for each block of the at least one decoded video frame is performed without use of metadata from the decoded video frame.

4. The method of claim 1, comprising producing the reference video data stream by decoding the encoded video stream.

5. The method of claim 1, comprising producing the reference video data stream by extracting prediction information from the encoded data stream.

6. The method of claim 1, wherein the step of comparing is used to determine the amount of the synchronization misalignment of the at least one decoded video frame and the blocks of reference video data frames.

7. The method of claim 1, wherein the comparison is made from the decoded video frame data without use of extracted information about an image pixel sequence of the decoded video frame data.

* * * * *